No. 807,649. PATENTED DEC. 19, 1905.
W. E. WILKINSON.
COMPOSITION OF MATTER FOR CLEANSING AND POLISHING FLAT IRONS.
APPLICATION FILED AUG. 5, 1904.

Witnesses.
Edw. P. Barrett
Louis B. Erwin

Inventor
William E. Wilkinson
By Rector & Hibben
His. Atty's.

UNITED STATES PATENT OFFICE.

WILLIAM E. WILKINSON, OF CHICAGO, ILLINOIS.

COMPOSITION OF MATTER FOR CLEANSING AND POLISHING FLAT-IRONS.

No. 807,649.　　　Specification of Letters Patent.　　　Patented Dec. 19, 1905.

Application filed August 5, 1904. Serial No. 219,601.

*To all whom it may concern:*

Be it known that I, WILLIAM E. WILKINSON, a citizen of the United States of America, residing at Chicago, in the county of Cook, in the State of Illinois, have invented a certain Improved Composition of Matter for Cleansing and Polishing Flat-Irons, of which the following is a description, reference being had to the accompanying drawings, forming a part of this specification.

My invention, broadly considered, is a composition of matter consisting of an abrasive substance and alkaline soap and a wax; but I have found that a small percentage of soda-ash, resin, and kerosene-oil may be added to the composition with advantage. I do not, however, intend to limit my invention to a composition in which the last-named ingredients are included except as to certain of the claims in which they are specifically named.

Figure 1:
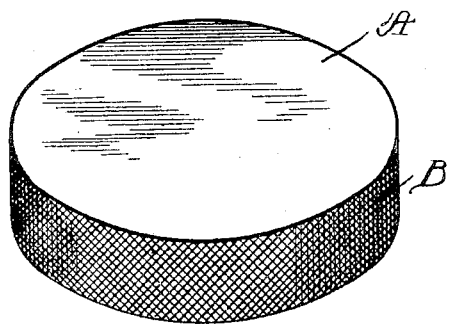
Figure 2:
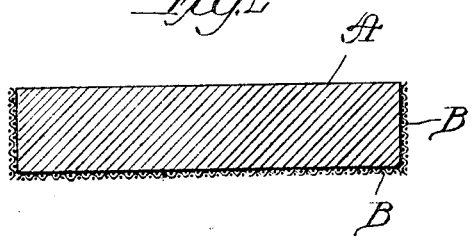

In the drawings, Figure 1 is a perspective view of a cake of my new composition, and Fig. 2 a vertical section through the center thereof.

Corresponding letters of reference refer to corresponding parts in both of the figures.

For the abrasive material of my new composition silica, ground quartz, marble-dust, plaster-of-paris, cement, emery, potter's clay, indurite, silexoid, coal-ash, ground rock of lime formation, or other abrasive substance may be employed. For the alkaline soap I preferably employ a cocoanut-oil soap, commonly called "marine" soap, containing a large percentage of silicate of soda. For the wax element of the composition I preferably employ mineral wax or paraffin, although beeswax may be substituted for it.

The following are some formulas under which the various ingredients may be efficiently combined for the purpose for which the composition is intended, the figures representing the proportions, by weight, of the several ingredients:

No. 1. 68, indurite; 23, marine soap; 1, soda-ash; 8, mineral wax; total, 100.

No. 2. 68, indurite; 21, marine soap; 1, soda-ash; 5, mineral wax; 5, water; total, 100.

No. 3. 68, silexoid; 1, soda-ash; 17, marine soap; 11, mineral wax; 1, kerosene-oil; 2, W. W. rosin; total, 100.

No. 4. 68, silexoid; 1, soda-ash; 11, mineral wax; 1, mineral oil; 1, W. W. rosin; 18, marine soap; total, 100.

The ingredients are placed in a suitable vessel and heated to a temperature of 140° to 212° Fahrenheit, which results in the formation of an emulsion. This emulsion is then boiled to evaporate the water and produce a thick creamy mass, which binds the abrasive, soap, and wax materials into a solid cake when cold. Such cakes are preferably formed by pouring the hot mixture into molds or holders made of woven fabric—such as linen, cotton, woolen, or hemp, preferably of rather stiff texture—or of woven wire-gauze, or, if desired, the substance may be poured into suitable frames and allowed to cool and set and be then cut and pressed into cakes or bars of desired size and shape and placed in holders of woven fabric, such as the molds above referred to. I find in practice that ordinary burlap saturated in a solution of silicate of soda and dried forms a desirable material for the molds or holders, and in the accompanying drawings I have shown a round cake A of my new composition of matter inclosed in a holder B, formed of burlap so treated, such holder being composed of a circular piece of burlap, upon which the bottom of the cake rests and to which it adheres sufficiently to hold the bottom in place, and a narrow strip of burlap passed around the circular edge of the cake and having its ends secured together. Such a holder preferably constitutes the original mold in which the cake was formed; but the cake may be formed independently and then placed in the holder, as explained.

In using my improved polishing and cleansing composition upon flat-irons the upper surface of the cake is rubbed upon the surface of the hot iron, and as the cake is worn away the edges of the woven fabric of the holder will be worn down with it, so that substantially the entire cake may be utilized. The soap and abrasive ingredient of the composition serve to cleanse and polish the surface of the iron, while the wax performs its usual function. The edges of the holder coöperate with the inclosed composition in distributing it over the surface of the iron and effectively cleansing and polishing it as the two are worn down together.

I do not, however, claim in this application the particular form of holder described, that being reserved as the subject of a separate application.

Having thus fully described my invention, I claim—

1. The herein-described composition of matter composed of an abrasive substance, an alkaline soap, and a wax; substantially as and for the purpose described.

2. The herein-described composition of matter composed of an abrasive substance, an alkaline soap, a wax, and soda-ash; substantially as and for the purpose described.

3. The herein-described composition of matter, composed of an abrasive substance, an alkaline soap, a wax, soda-ash and resin; substantially as and for the purpose described.

4. The herein-described composition of matter composed of an abrasive substance, an alkaline soap, a wax, soda-ash, mineral oil and resin; substantially as described.

WILLIAM E. WILKINSON.

Witnesses:
 EDWARD RECTOR,
 LOUIS B. ERWIN.